(12) United States Patent
Hernan Pedros

(10) Patent No.: US 11,959,283 B2
(45) Date of Patent: Apr. 16, 2024

(54) HEAT AND/OR LIGHT REGULATING SYSTEM

(71) Applicant: JMH CONCEPTEUR SLU, Girona (ES)

(72) Inventor: Jean Michel Hernan Pedros, Girona (ES)

(73) Assignee: JMH CONCEPTEUR SLU, Girona (ES)

( * ) Notice: Subject to any disclaimer, the term of this patent is extended or adjusted under 35 U.S.C. 154(b) by 513 days.

(21) Appl. No.: 16/910,060

(22) Filed: Jun. 23, 2020

(65) Prior Publication Data

US 2020/0318356 A1    Oct. 8, 2020

Related U.S. Application Data

(63) Continuation of application No. PCT/EP2017/084575, filed on Dec. 24, 2017.

(51) Int. Cl.
*E04F 10/08* (2006.01)
*E04F 10/10* (2006.01)
*H02S 20/26* (2014.01)

(52) U.S. Cl.
CPC ............. *E04F 10/08* (2013.01); *E04F 10/10* (2013.01); *H02S 20/26* (2014.12)

(58) Field of Classification Search
CPC ...................................................... E04F 10/08
USPC .............................................................. 49/125
See application file for complete search history.

(56) References Cited

U.S. PATENT DOCUMENTS

| | | | | |
|---|---|---|---|---|
| 2,094,801 A | * | 10/1937 | Mass ........................ | E04B 7/166 52/64 |
| 3,093,834 A | * | 6/1963 | Watkins ................... | E04H 3/165 D25/56 |
| 3,113,434 A | * | 12/1963 | Phillips .................... | E04F 10/08 52/95 |
| 3,115,728 A | * | 12/1963 | Becker ..................... | E04F 10/08 52/470 |
| 3,286,404 A | * | 11/1966 | Harrison .................. | E04F 10/08 52/75 |
| 3,589,084 A | * | 6/1971 | Reed, III ................. | E04B 7/166 52/64 |

(Continued)

FOREIGN PATENT DOCUMENTS

| | | |
|---|---|---|
| EP | 1964990 A1 | 9/2008 |
| EP | 2905401 A1 | 8/2015 |

(Continued)

OTHER PUBLICATIONS

PCT/EP2017/084575 Written Opinion, Jun. 27, 2019.

*Primary Examiner* — Basil S Katcheves
(74) *Attorney, Agent, or Firm* — Renner, Otto, Boisselle & Sklar, LLP

(57) ABSTRACT

In a system (100) configured for heat and/or light regulation, in which the system is coupled to a side (104) of a structure (102), there is included at least one displacement means (110) fixed to the side (104). System (100) further includes at least one moveable pergola (120) detachably coupled to the at least one displacement means (110). The at least one displacement means (110) is configured for enabling displacement of the at least one moveable pergola (120) in both a lateral direction and a perpendicular direction (180) to the side (104) of the structure (102) along the ground (125).

16 Claims, 14 Drawing Sheets

(56) References Cited

U.S. PATENT DOCUMENTS

| | | | | |
|---|---|---|---|---|
| 4,301,851 | A * | 11/1981 | Gitkin | E06B 9/92 |
| | | | | 160/46 |
| 4,726,410 | A * | 2/1988 | Fresh | E06B 9/327 |
| | | | | 160/171 |
| 5,280,687 | A * | 1/1994 | Boiteau | E04F 10/0633 |
| | | | | 160/67 |
| 5,794,679 | A * | 8/1998 | Williams | E04F 10/02 |
| | | | | 160/46 |
| 7,748,429 | B2 * | 7/2010 | Caire | E04F 10/0607 |
| | | | | 160/46 |
| 7,900,417 | B1 * | 3/2011 | Leines | E04F 10/08 |
| | | | | 52/653.1 |
| 8,051,866 | B2 * | 11/2011 | Cutler | E04F 10/0607 |
| | | | | 135/117 |
| 8,381,452 | B1 * | 2/2013 | Forsland | E04B 7/166 |
| | | | | 52/64 |
| 8,640,420 | B1 * | 2/2014 | Halley | E04F 10/08 |
| | | | | 52/650.1 |
| 8,707,632 | B2 * | 4/2014 | Forsland | E04B 7/166 |
| | | | | 52/79.5 |
| 9,255,441 | B2 * | 2/2016 | Shargani | E04F 10/0633 |
| 9,458,621 | B2 * | 10/2016 | Calafatis | E04B 1/34384 |
| 2010/0139872 | A1 | 6/2010 | Caire et al. | |
| 2011/0197536 | A1 * | 8/2011 | Clark | E04F 10/08 |
| | | | | 52/650.1 |
| 2011/0308173 | A1 * | 12/2011 | Forsland | E04B 1/0046 |
| | | | | 52/67 |
| 2012/0000141 | A1 * | 1/2012 | Forsland | E04B 1/343 |
| | | | | 52/66 |
| 2014/0262059 | A1 * | 9/2014 | Gelsebach | E04H 15/58 |
| | | | | 160/22 |
| 2015/0218807 | A1 * | 8/2015 | Capati | E04B 1/36 |
| | | | | 52/66 |
| 2016/0177575 | A1 * | 6/2016 | Ivic | E04F 10/08 |
| | | | | 52/302.1 |

FOREIGN PATENT DOCUMENTS

| | | |
|---|---|---|
| EP | 3129 A1 | 2/2017 |
| EP | 3124716 A1 | 2/2017 |

\* cited by examiner

HEAT AND/OR LIGHT REGULATING SYSTEM

CROSS-REFERENCE TO RELATED APPLICATIONS

The present application claims the benefit under 35 U.S.C. § 363, § 365(c) and § 120 of PCT International Application Serial No. PCT/EP2017/084575 to applicant, filed Dec. 24, 2017, pending, the entire contents of which is hereby incorporated by reference herein.

BACKGROUND

1. Field

Example embodiments in general relate to a heat and/or light regulating system, more particularly to a system for regulating heat and/or light that is impinging on an external area of a structure such as a building.

2. Related Art

Solar protection systems such as pergolas exist to protect terraces, plazas, or paths in a park, for example. Pergolas are not built on buildings, as in these cases awnings are used for solar protection. However, a problem with the use of awnings is that they only protect the building from the sun from above, but not from light or heat coming in from sides of the building.

Solar rays not only illuminate but also transfer heat; however, situations exist where users need to regulate these parameters independently from each other. For example, it might be desirable to block the heat of direct sun light, but at the same time allow as much luminosity as possible there through. Conversely, it might be desirable to allow as much heat as possible through, but to minimize the pass-through luminosity.

Existing solar protection systems have a disadvantage in that they are designed to protect a certain surface for a certain time, because these systems are fixed with respect to the sun, and thus lose effectiveness with the movement of the sun. Moreover, the use of blinds has a disadvantage in that they must be rolled down entirely during exposure to the sun, so that the interior is completely dark. Accordingly, it is necessary to turn on a light in order to see within a room having drawn blinds. Additionally, most conventional solar protection systems are rigid and inflexible to variations in solar position and radiation, such as those variations caused by different solar impinging angles, or drifting clouds. One such system is described in publication EP 3,124,716 A1 to the inventor, which refers to a movable pergola configured to move in a parallel direction to the face of a building the pergola provides shade for.

Therefore, a need exists to effectively solve the above-mentioned problems.

SUMMARY

An example embodiment of the present invention is directed to a system (100) configured for heat and/or light regulation, the system coupled to a side (104) of a structure (102), where the system includes at least one displacement means (110) fixed to the side (104), and at least one moveable pergola (120) detachably coupled to the at least one displacement means (110). The at least one displacement means (110) is configured for enabling displacement of the at least one moveable pergola (120) in both a lateral direction and a perpendicular direction (180) to the side (104) of the structure (102) along the ground (125).

Another example embodiment is directed to a system (100) configured for heat and/or light regulation, the system coupled to a side (104) of a structure (102). The system includes at least one displacement means (110) fixed to the side (104), at least one moveable pergola (120) detachably coupled to the at least one displacement means (110), the at least one displacement means (110) enabling the moveable pergola (120) to travel in both a lateral and perpendicular direction relative to the side (104), and a plurality of slats arranged in spaced relation to one other within the moveable pergola (120) to regulate impinging sun and/or wind.

Another example embodiment is directed to a system (100) configured for heat and/or light regulation, the system coupled to a side (104) of a structure (102). The system includes displacement means (110) fixed to the side (104), and a pergola (120) detachably coupled to the displacement means (110) and moveable in multiple directions thereby. The pergola (120) further includes a frame supporting heat regulating means for regulating impinging sun and/or wind, the frame being formed of multiple beams, with at least one beam of which has travel means arranged thereon to enable the pergola (120) to move relative the displacement means (110).

BRIEF DESCRIPTION OF THE DRAWINGS

The example embodiment will become more fully understood from the detailed description given herein below and the accompanying drawings, wherein like elements are represented by like reference numerals, which are given by way of illustration only and thus are not limitative of the example embodiments herein.

DETAILED DESCRIPTION

Figure 1:
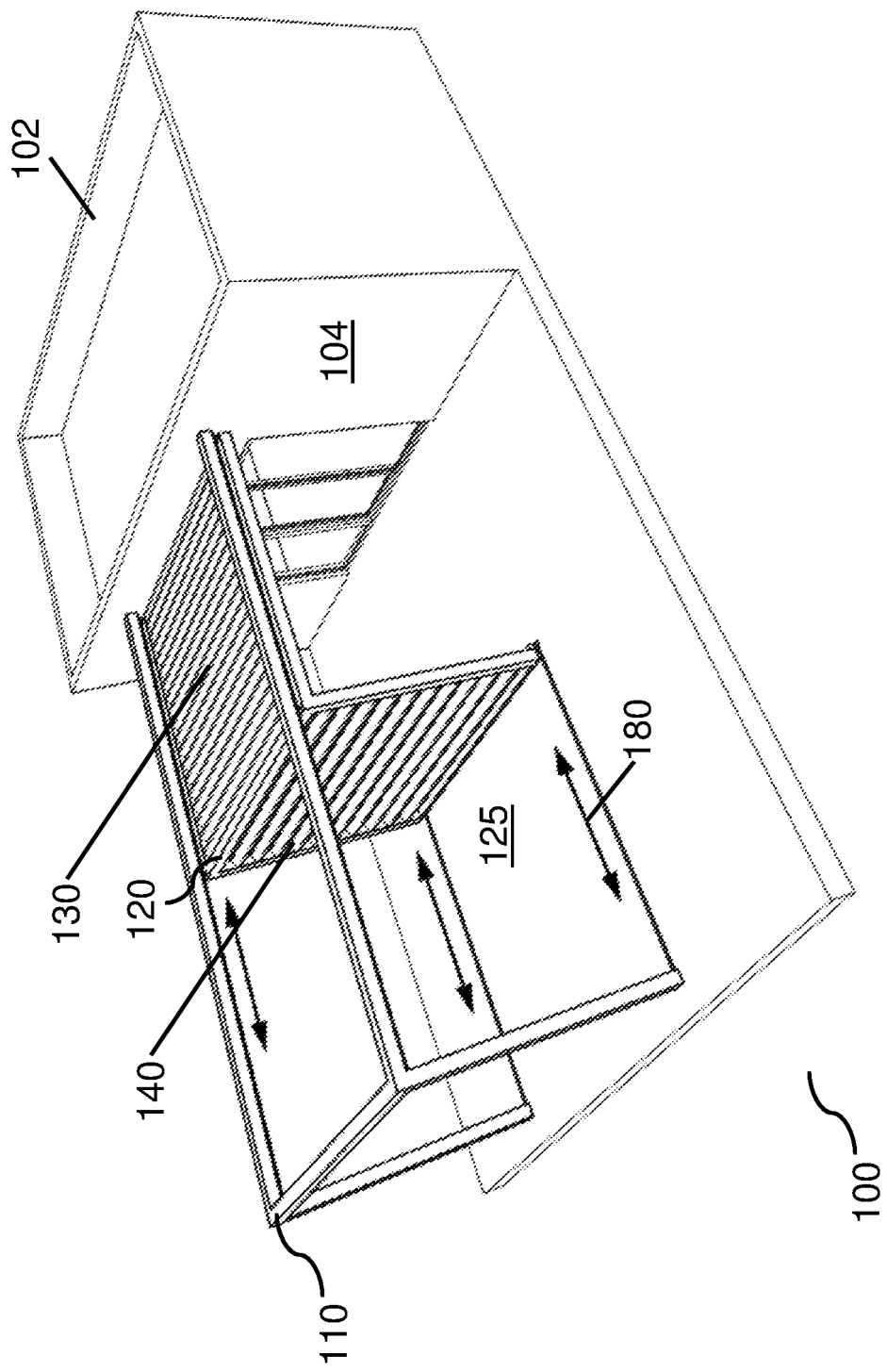
FIGS. 1 and 7 depict a regulating system according to an example embodiment of the present invention.

As to be described in greater detail hereafter, the example embodiments offer a heat and/or light regulating system for buildings that is user-friendly, allowing a user to globally regulate the amount of heat and/or light being blocked, or conversely being allowed through, in a variable and flexible manner.

The example system is designed to be attached to the structure it serves, such as a building. The system includes at least one pergola moveably coupled to displacement means acting as a fixed support. The displacement means is coupled to the structure and permits free and easy displacement of the pergola in multiple directions. This increases or decreases shade area coverage according to circumstances. Further, the displacement means permits easy storage of the pergola, which can be retracted into the structure. For large surfaces, the system is configured to permit the same flexibility using a plurality of overlapping pergolas.

As used herein, the phrase "present invention" should not be taken as an absolute indication that the subject matter described by the term "is covered by either the claims as they are filed, or by the claims that may eventually issue after patent prosecution; while the term "present invention" is used to help the reader to get a general feel for which disclosures herein are believed as maybe being new, this understanding, as indicated by use of the term "present invention," is tentative and provisional and subject to change over the course of patent prosecution as relevant information is developed and as the claims are potentially amended.

Reference throughout this specification to "one example embodiment" or "an embodiment" means that a particular system, method, feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular systems, methods, features, structures or characteristics may be combined in any suitable manner in one or more example embodiments.

The term "and/or" may be understood to mean non-exclusive or; for example, A and/or B means that: (i) A is true and B is false; or (ii) A is false and B is true; or (iii) A and B are both true. As used in this specification and the appended claims, the singular forms "a," "an," and "the" include plural referents unless the content clearly dictates otherwise. The term "or" is generally employed in its sense including "and/or" unless the content clearly dictates otherwise.

Unless the context requires otherwise, throughout the specification and claims that follow, the word "comprise" and variations thereof, such as "comprises" and "comprising," are to be construed in an open, inclusive sense, that is, as "including, but not limited to." As used in the specification and appended claims, the terms "correspond," "corresponds," and "corresponding" are intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

A regulating system for heat and/or light regulation as described hereafter is configured to be coupled to the side of a structure such as a building. The system allows the ability to flexibly regulate the amount of sun rays allowed to pass through, and those solar rays which are to be blocked, thereby regulating the amount of heat and/or light which is permitted there through.

As to be shown in more detail hereafter, the system comprises at least one displacement means and at least one moveable pergola detachably coupled to the at least one displacement means. The at least one displacement means is fixed to the side of the structure, and is configured for enabling the displacement of the at least one moveable pergola in at least a perpendicular direction to the side of the structure, that is, away from the structure. In another aspect, the at least one displacement means is configured for enabling the displacement of the at least one moveable pergola in at least the lateral direction to the side of the structure, that is, along the side of the structure.

In another aspect, the at least one displacement means is configured to extend into or on top of the structure, either above or below the roof. This allows displacing the at least one pergola as close as necessary to the structure. It also permits the pergola to abut the side of the structure, leaving no space underneath, so that the pergola acts as a window blind blocking sunlight into the interior of the structure. In this configuration the pergola may also be advantageously stowed away for storage.

The system is configured so that the moveable pergola is detachably coupled under the at least one displacement means. In this configuration, the pergola is arranged so as to hang from the displacement means. This configuration facilitates the movement of the pergola for the user, due to reduced friction. Additionally, and from the point of view of a user sitting under the pergola, the displacement means remains hidden behind the pergola, which can be more visually pleasing to users standing or seated beneath the pergola.

In another aspect, the at least one moveable pergola is detachably coupled over the at least one displacement means. In this configuration, the weight of the pergola is fully supported by the displacement means, thereby providing a safe support. Additionally, the coupling mechanism arranged between the pergola and the displacement means may be of simpler construction. Further, with this configuration the dimensions of the displacement means may be smaller overall, yet provides full pergola displacement and thus the same amount of shade coverage.

In an example, the displacement means includes at least two L-shaped sets of beams connected to each other via a crossing beam at a distal end of the structure, (i.e., at the end which is furthest away from the building). Each beam set comprises a vertical beam connected to a perpendicular beam at adjacent connecting ends, thereby configuring an L-shape. At its non-connecting end, each vertical beam is fixed to the ground. At its connecting end, each perpendicular beam is coupled to the building. As mentioned, the two perpendicular beams may be coupled to the building at the side of the building, or extend into the building, above or below the roof. In another aspect, the two perpendicular beams may be connected to each other via a crossing beam, and the crossing beam is fixed to the side of the building.

In an example, the vertical section of the displacement means has an inverted U-shaped configuration comprising three beams, and in an alternative may be a frame of four beams. In either configuration, the vertical section is fixed to the ground to provide rigidity and stability to the entire displacement means.

In an example, the top or horizontal section of the displacement means may have a U-shaped configuration on its side, and may comprise three or four beams structured as a frame. In either configuration, the crossing beam (beam parallel to the side of the building, either at its proximal or distal end) is configured to couple with the pergola, allowing lateral movement for the pergola. The perpendicular beam (beam perpendicular to the side of the building) is configured to couple with the pergola to enable perpendicular movement of the pergola towards or away from the building. Therefore, the at least one displacement means is configured to allow the displacement of the at least one moveable pergola in both lateral and perpendicular directions to the plane of the side of the structure.

As mentioned above, the moveable pergola is configured for displacement along the beams of the displacement means. The at least one moveable pergola further includes at least one section having heat regulating means for regulating impinging sun and/or wind, and at least one travel means configured for allowing the movement of the at least one heat regulating section. Each heat regulating section is formed by a frame of four beams supporting the heat regulating means, and the travel means is configured so as to be included in at least one of the four beams of the frame.

In a case where the heat regulating section is on the superior side of the pergola, the at least one section is a horizontal section, and the heat regulating means is configured for regulating sun and/or wind impinging from a substantially vertical direction. In this case, the travel means of the horizontal section is configured in any one of the parallel beams of the frame. For additional safety and movement facility, the travel means can be included in two, three, or on all four beams. Therefore, the horizontal section may be displaced in both perpendicular and lateral directions.

In a case where the heat regulating section is arranged on the lateral side of the pergola, the at least one section is a vertical section, and the heat regulating means is configured for regulating sun and/or wind impinging from a substantially lateral direction. The at least one vertical section may be arranged such that its plane is parallel and/or perpendicular to the plane of the side of the structure, thereby providing coverage at the sides of the heat regulating system. Hence, it may be configured to provide coverage from the lateral or distal ends of the heat regulating system.

The travel means of the vertical section is configured in the beam of the frame in contact with the ground, for displacement along the ground. In a case where independent movement is desired with respect to the horizontal section, the travel means in the at least one beam of the frame is in contact with the displacement means, for displacement along the horizontal section beam. Therefore, the vertical section may be displaced in both perpendicular and lateral directions.

The travel means in an example may include wheels and rails with complementary profiles. In one aspect, the rail of the travel means of the at least one vertical section has a convex profile, whereas the rail of the travel means of the horizontal section is a hollow rail that allows the insertion of the wheels and a hanging fastening of the horizontal section. The moving end of the horizontal section comprises first and second travel means that engage with complementary support elements of the displacement means. In order to facilitate the displacement of the at least one vertical section, the heat regulating system may further include at least one ground rail for facilitating the movement of the travel means of the at least one vertical section on the ground.

Although the heat regulating system may comprise only a single horizontal section, or a single vertical section, it is commonly configured with at least one horizontal section and at least one vertical section. The heat regulating system is configured so that the at least one moveable pergola comprises any combination of horizontal sections and vertical sections. In this manner, the heat and/or light regulation can be optimized, as it can block impinging rays as the impinging angle varies throughout the day, and also covers any diagonally impinging rays.

In this configuration, the at least one vertical section is coupled to its respective horizontal section at an angle, and the travel means in the horizontal and vertical sections is configured to allow the combined movement of the sections together in the same direction, or the relative movement of the sections with respect to each other in different directions. The angle may be any angle between 45° and 135°, and in a given example the angle is 90°.

The at least one moveable pergola comprises one single shared beam for coupling the horizontal section to the at least one vertical section, said beam preferably having a rectangular shape or being L-shaped. In a particular aspect, the system comprises one single beam that connects the two sections and that is shared by the two connecting ends of the sections. That is, this shared beam may belong either to the vertical section or to the horizontal section. Therefore, in one aspect the shared beam is part of the vertical section, whereas in other aspects it is part of the second section. By doing so, one beam is saved is saved from one of the frames and the assembly of the entire system is easier. In the aspects in which the vertical section and the horizontal section form a 90° angle it may be an L-shaped shared beam which on both ends of the L comprise the assembling means to couple it to the two first and second sections.

Alternatively, the shared beam has a rectangular shape with a first side coupled to the vertical section and a second side, contiguous to the first side, coupled to the horizontal section. In still another alternative, the shared beam has a triangular shape to facilitate an inclination between the vertical section and the horizontal section. The triangular shape can be adapted so as to achieve the desired inclination. For reasons of assembly, in on configuration the shared beam is arranged within the frame of the vertical section.

The two connecting ends of the regulating sections have mounting means in order to couple the vertical section to the horizontal section. These mounting means may comprise a number of fasteners, for example, screws with nuts, threaded screws or nails, and the corresponding openings for a strong, secure fastening.

The travel means of the vertical section may comprise one or more wheels that are fastened to the frame to allow movement. It may be a central wheel, two wheels separated from one another along a beam on the moving end or more wheels distributed along a beam on the moving end. The travel means may also be embedded in the beam on the moving end, protruding only a little in order to allow the movement without friction.

In order to prevent movement beyond the travel path, a rail can be used to guide the travel means. This may be a rail with a convex profile having two protuberances on the edges of the rail between which the travel means are moving. Alternatively, this may be a rail with a concave profile with one protuberance in the center in which the travel means, which has a complementary profile, engages. The rail profile may be embodied as wheels with two protuberances on the edges, or as a rail with a convex profile mounted along a beam on the moving end. The rail is mounted on the floor along the variable surface to be protected.

In the case of the travel means being in a horizontal section, this configuration incorporates a support system that fastens or supports the horizontal section. The support system fastens the horizontal section via the travel means. The support system can be mounted onto a structural element that supports the weight of the regulating system, for example an additional third frame, and that covers the entire path of the possible range of movement.

If the regulating system is mounted on a building, such as a private home, the support system may be arranged on the wall of the building adjacent to the area to be protected. The support system includes at least one mounting element that allows it to be fixed to the structural element, and a fastening element that allows coupling and supporting or fastening the second section of the system. In an example, the fastening element also allows for movement of the system.

In one aspect, the travel means of the horizontal section may be a combination of wheels and rails or a combination of rails with complementary profiles. These may be the same wheels and complementary rails that are used as travel means for the vertical section. However, for improved fastening and security, the rail has a hollow shape adapted to receive the wheels therein and account for movement inside the rail. This hollow rail has a first side represented as a surface upon which the wheels travel, an opening on a second side opposite the first side to permit movement of the wheels, and third and fourth sides perpendicular to the first and second sides and having dimensions so as to house the wheels. The hollow rail may have a rectangular or substantially rectangular shape, but a triangular shape is also possible, wherein the second side is the opening or a curved shape in which the third and fourth sides are curved.

In an alternative aspect, wheels are used to move the regulating system instead of the hollow rail, and a guide bar is inserted into the hollow rail and can be extended along a part of the moving end or along its entirety. In this arrangement the hollow rail may have even other shapes that depend on the shape of the guide bar and which ensure sound fastening.

The horizontal section may include a travel means in different configurations. For example, the travel means may be directed downwards such that the corresponding rail lies below the second section and supports that section. The travel means may also be on the same plane as the second section such that the corresponding rail is at the same height. Or the travel means can be directed upwards such that the corresponding rail lies above the second section and thus a hanging fastening is obtained, which may reduce on-site assembly duration.

Heat and/or light may be dynamically regulated by increasing or decreasing the coverage of the at least one mobile pergola, as well as adjusting the position by moving the at least one mobile pergola in a lateral or perpendicular direction. Further accuracy in heat and/or light regulation may be achieved by varying the characteristics of the heat regulating sections. In one aspect, the heat regulating means comprises a plurality of slats in spaced relation from each other. The plurality of slats provides solar protection, but still allow the passage of sufficient light so that the protected area is not entirely dark. Each slat may have an ellipsoidal or trapezoidal shape, an in one example may include wings on the ends. Each slat may be fixed or moveable. Since the slats may be rotated around their longitudinal axis, further regulation can thus be achieved. For example, in case a low sun shines a lateral ray onto a user's face, this lateral ray can be blocked simply by adjusting a single slat.

The number of slats may vary based on the size of the frame, with the desired distance between the slats or the size of the slats themselves. In one example, there may be between 10 to 30 slats, although there may also be less than 10 or more than 30 slats. The spacing between individual slats may vary from 5 to 10 cm. The slats may be fixed, that is, having a predefined configuration such that the construction of the sections is easier, automatic, and the resulting product more economic. In such a case, the slats are assembled with a certain fixed inclination for better solar protection. For example, the fixed inclination of the slats may vary between 10° and 80° with respect to the plane of the frame, another example range being between 35° and 55°.

Alternatively, the system may employ moveable slats in order to allow an adjustment of solar protection during the day and according to the weather conditions. The mobility of the slats may be obtained based on usual techniques in the technical field and allow for a moveable inclination that may vary between 0° and 90° with respect to the plane of the frame. The slats can be assembled horizontally, vertically, or even diagonally. Both sections may comprise either fixed slats or mobile slats. It is also possible that one section comprises fixed slats whereas another section comprises mobile slats.

In some aspects, the slats may have an ellipsoidal shape, or alternatively have a trapezoidal shape with a wing of just a few centimeters, for example between 2 and 5 centimeters on each end, in order to provide more solar protection. In any case, the slats are mounted onto the frame with common fasteners (not shown), such as for example nails, screws, nuts or others.

The trapezoidal-shaped slats include three openings for their mounting with screws. One advantage of having three openings (vice two openings as in the case of ellipsoidal-shaped slats) lies in improved fastening of the slats and therefore less movement thereof due to movement of the pergola or the wind. Also, if a screw breaks for any reason during assembly of the slats, there are still two more openings with which to fasten the slat.

In another aspect, the heat regulating means comprises a sheet of material with a plurality of openings. In yet another aspect, the heat regulating means comprises a sheet of material without openings. In another aspect, the heat regulating means comprises at least one solar panel for collecting impinging solar energy.

As previously mentioned, the coverage area may be increased, since the system includes a plurality of moveable pergolas of step-wise differing dimensions configured to be stored under, or partially overlapping, each other. They may therefore be displaced to partially overlap each other, or fully extend side-by-side, depending on the coverage area required. Due to their step-wise differing dimensions, they may be easily and conveniently stored under each other.

The material of the regulating system may be variable and it is possible to combine different materials. In an example, a single material is used for the regulating sections and the slats. Useful materials for the regulating sections may be heat-stable plastic, wood, aluminum or other metallic materials. Example useful materials for the slats may be heat-stable plastic, wood, aluminum or other metallic materials and even stone. The displacement means is made of any suitable material, such as aluminum, wood, heat-stable plastic or a combination thereof.

Figure 7:
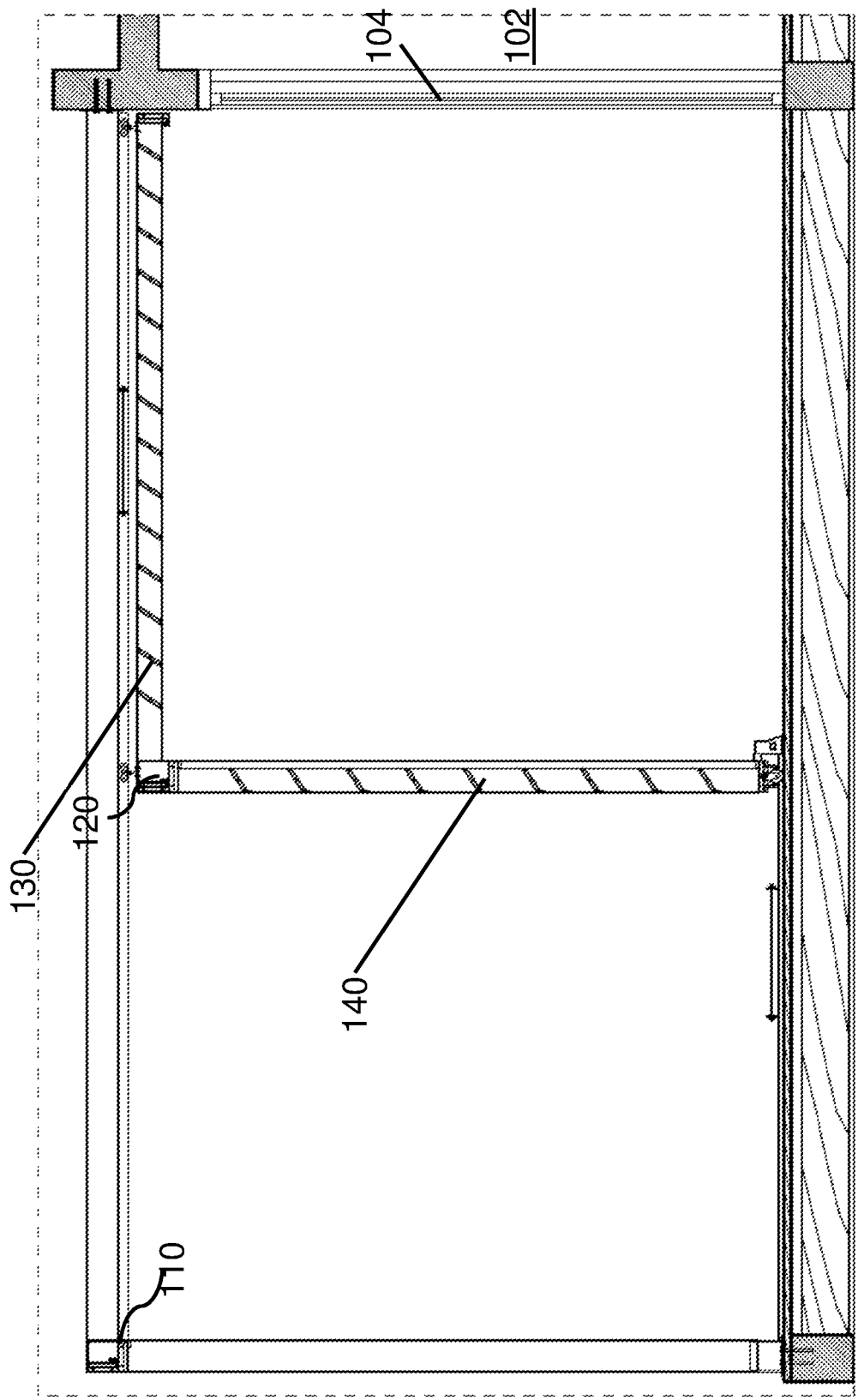

FIG. 1 shows a regulating system 100 ("system 100") according to an example embodiment coupled to a structure 102 such as a building (hereafter structure and building are denoted as "102"). The structure 102 has at least one side 104, to which the system 100 is coupled to for providing heat and/or light regulation to an area inside the structure 102 or to an area under the system 100. System 100 includes displacement means 110 and a mobile pergola 120. In this example, system 100 is configured for displacing the mobile pergola 120 in a perpendicular direction 180 to the side of the structure 102, that is, away from the building 102. As can be seen, the mobile pergola 120 is hanging from the displacement means 110, which is fixed to the side of the structure 102 via its two perpendicular beams directly connected to the side of the structure 102. The mobile pergola 120 comprises a horizontal regulating section 130 coupled to a distal vertical regulating section 140 at a 90° angle. The mobile pergola 120 may therefore be displaced perpendicularly along the ground 125, varying the shaded area provided by the horizontal and vertical sections 130, 140 from the proximal end of the building 102 to the distal end until the end of the displacement means 110. FIG. 7 depicts a lateral section of system 100, wherein it can be seen how the pergola 120 is supported underneath the displacement means 110.

Figure 2:
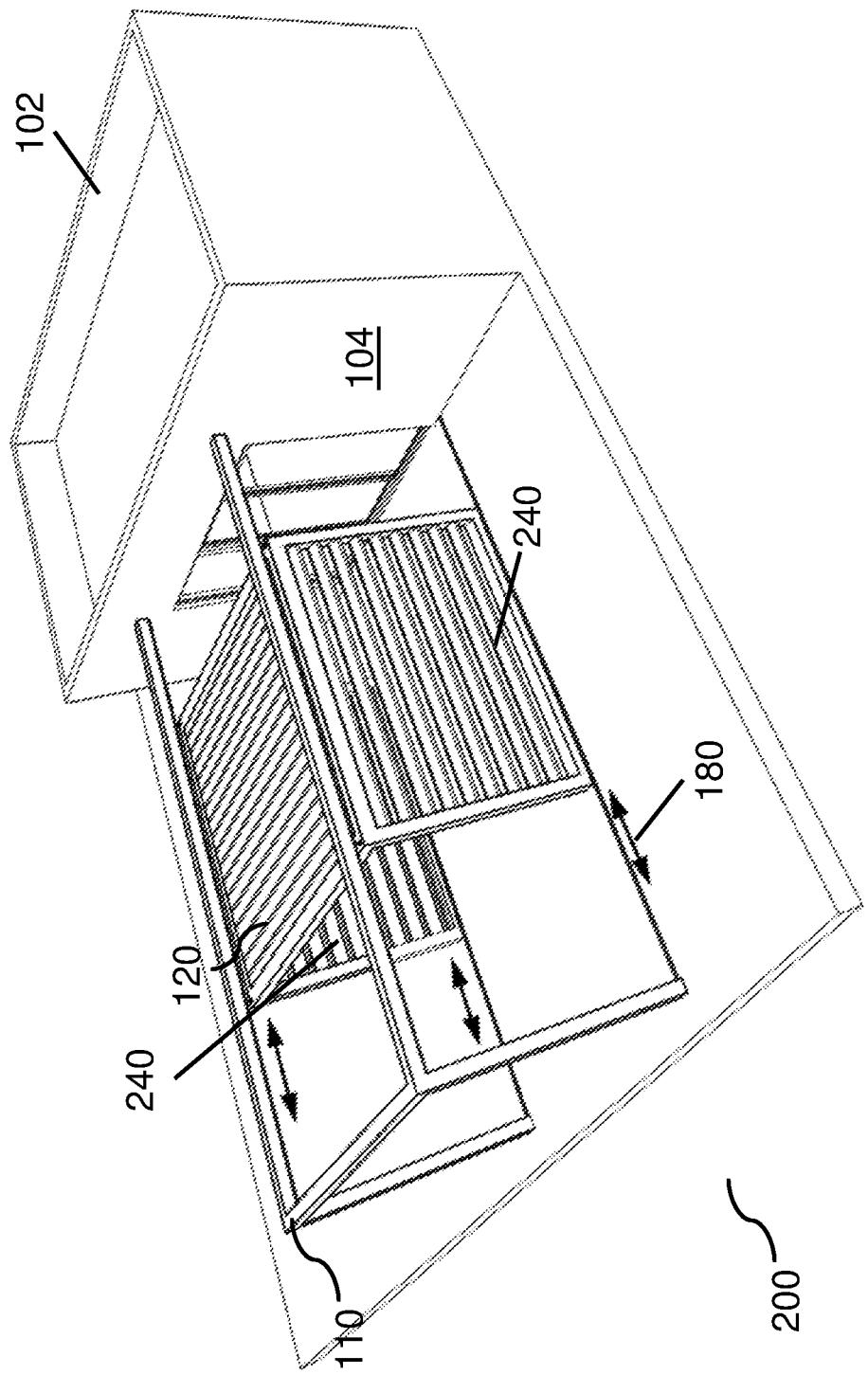
FIGS. 2 and 8 depict a regulating system according to another example embodiment of the present invention.
Figure 8:
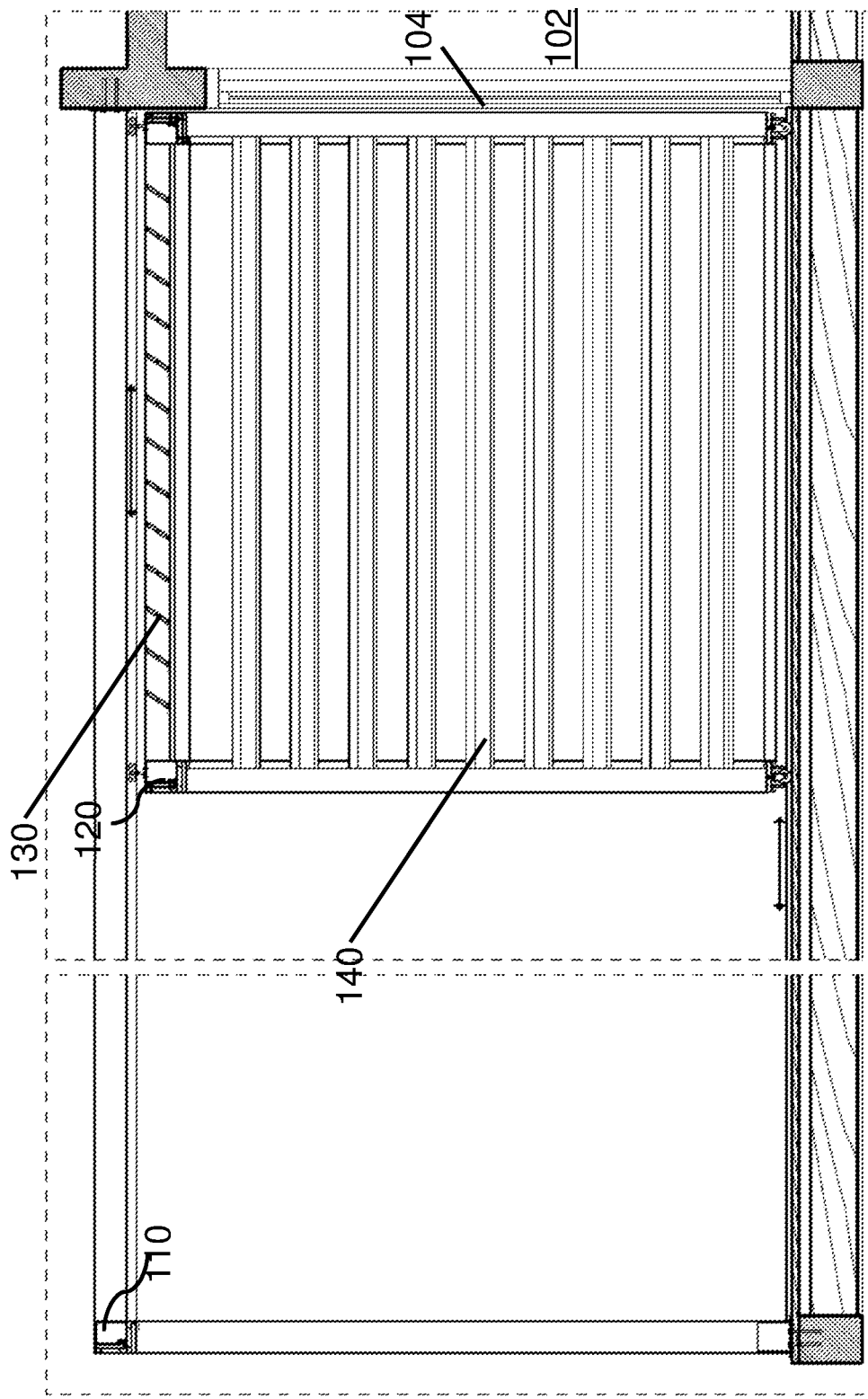

FIG. 2 shows a regulating system 200 ("system 200") according to another example embodiment. In this example, the pergola 120 comprises two lateral vertical sections 240, instead of the single vertical section of FIG. 1. The mobile pergola 120 may therefore be displaced perpendicularly along the ground, varying the shaded area provided by the horizontal and two lateral vertical sections from the proximal end of the building 102 to the distal end until the end of the displacement means 110. FIG. 8 depicts a lateral section of system 200, wherein it can be seen how the pergola 120 is supported underneath the displacement means 110.

Figure 3:
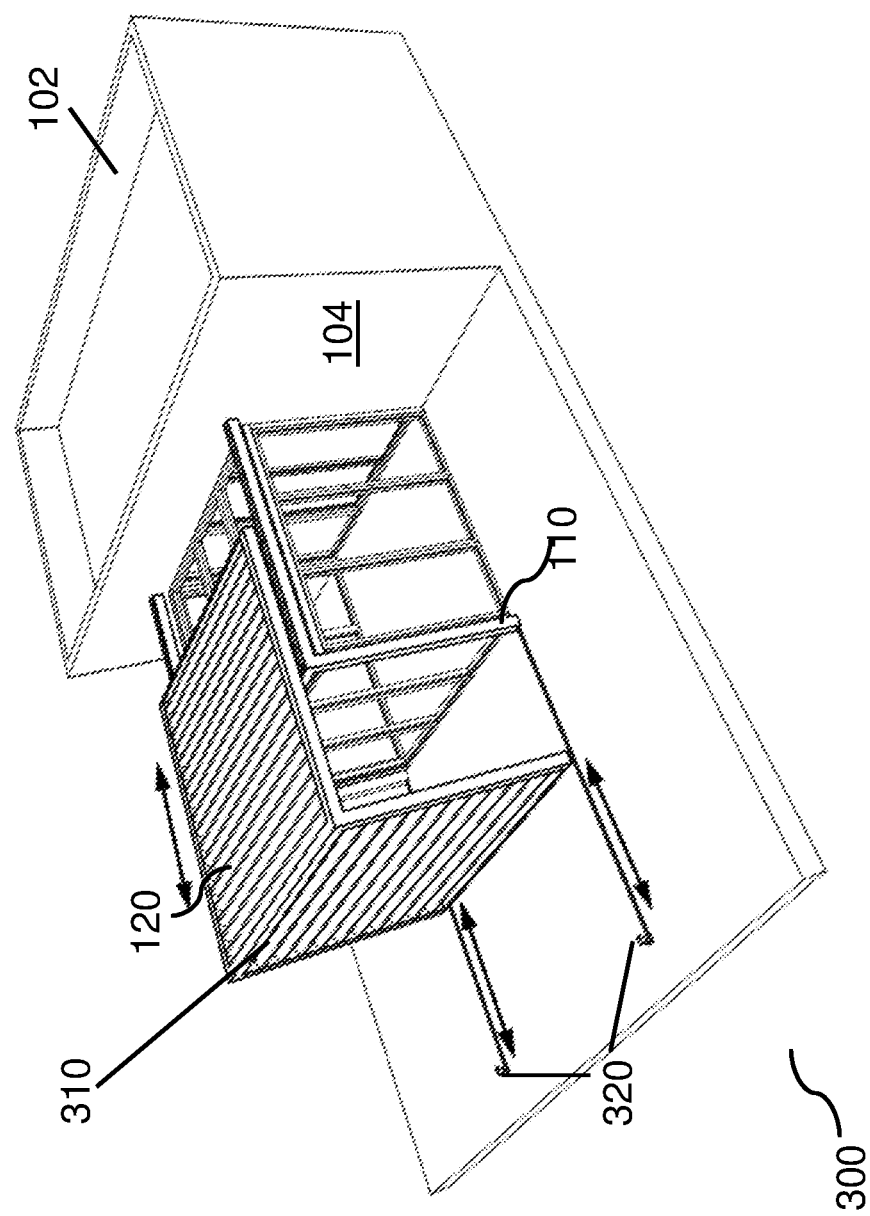
FIGS. 3 and 9 depict a regulating system according to another example embodiment of the present invention.
Figure 9:
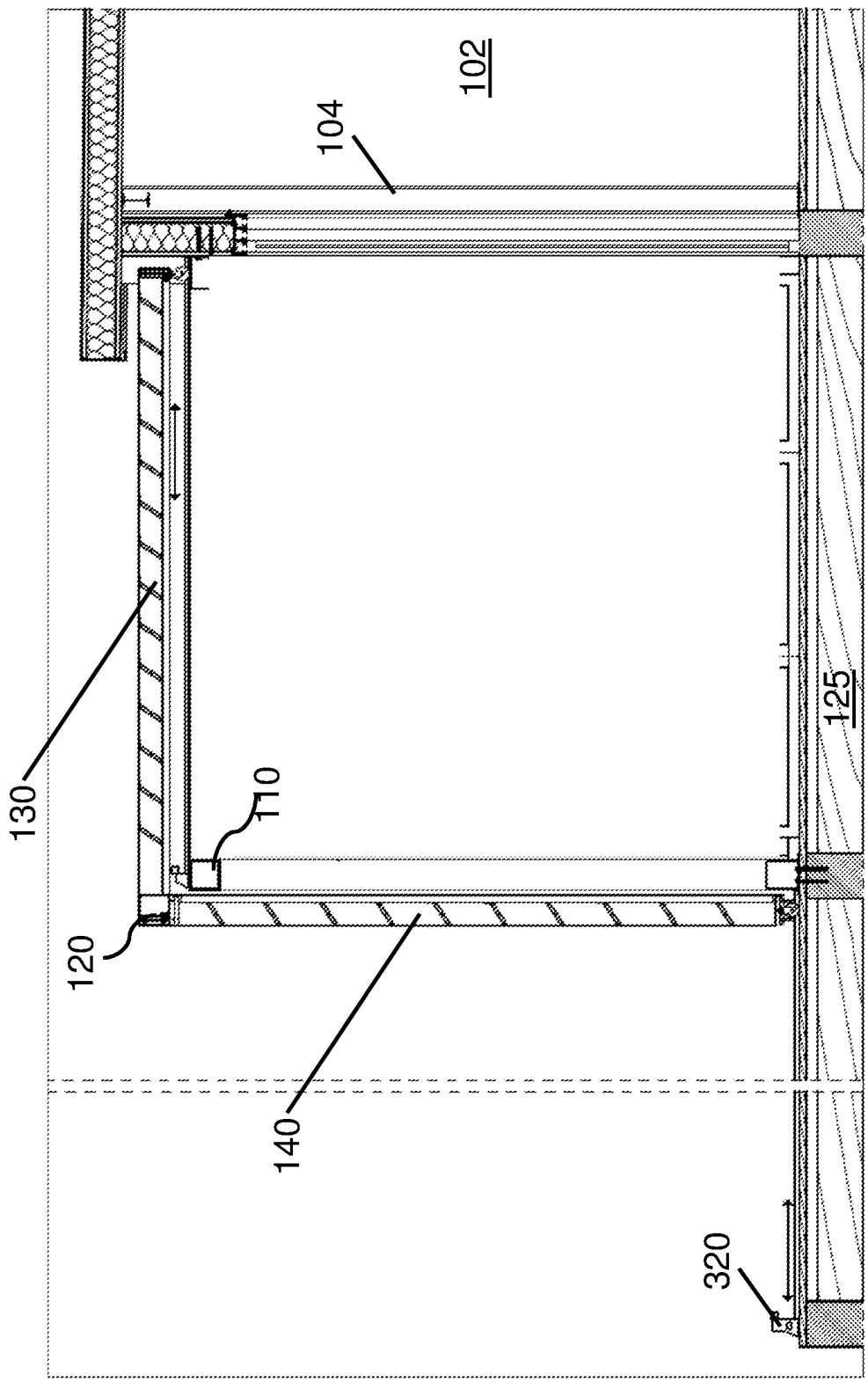

FIG. 3 shows a regulating system 300 ("system 300") according to another example embodiment. As can be seen, the mobile pergola 120 is on top of the displacement means 110, which supports the weight of the mobile pergola 120. Advantageously, the displacement means 110 occupies much less space. The mobile pergola 120 may therefore be displaced perpendicularly along the ground, varying the shaded area from the proximal end of the building 102 to the distal end until the end of the displacement means 110. Once reaching the end of the displacement means, the mobile pergola 120 may be laterally displaced along the distal beam 310 of the displacement means 110 until blocks 320 hinder further movement. FIG. 9 depicts a lateral section of system 300, wherein it can be seen how the pergola 120 is supported on top of the displacement means 110. The displacement means 110 therefore occupies much less space, and is faster to deploy, as well as necessitating less material.

Figure 4:
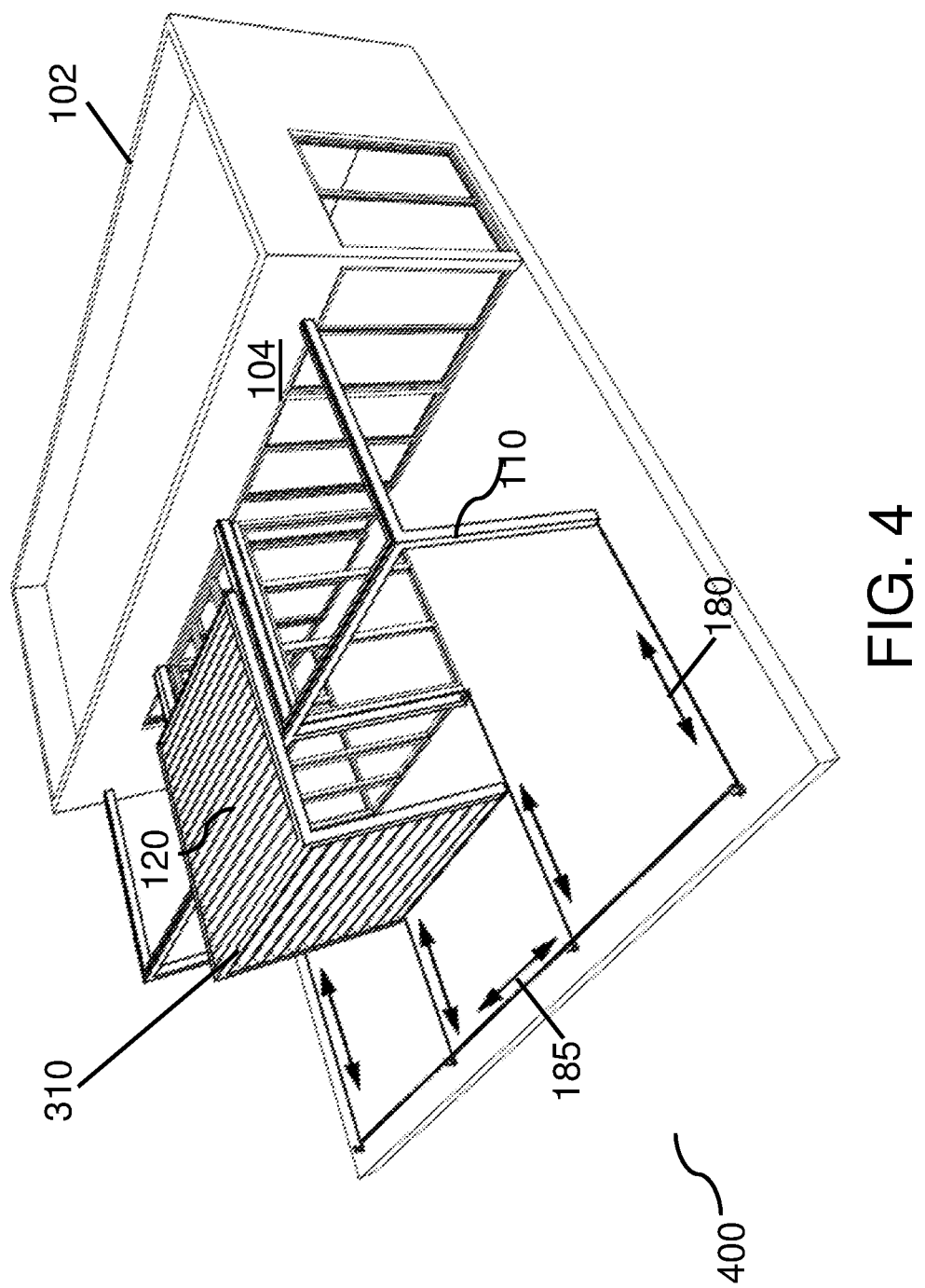
FIGS. 4 and 10 depict a regulating system according to another example embodiment of the present invention.
Figure 10:
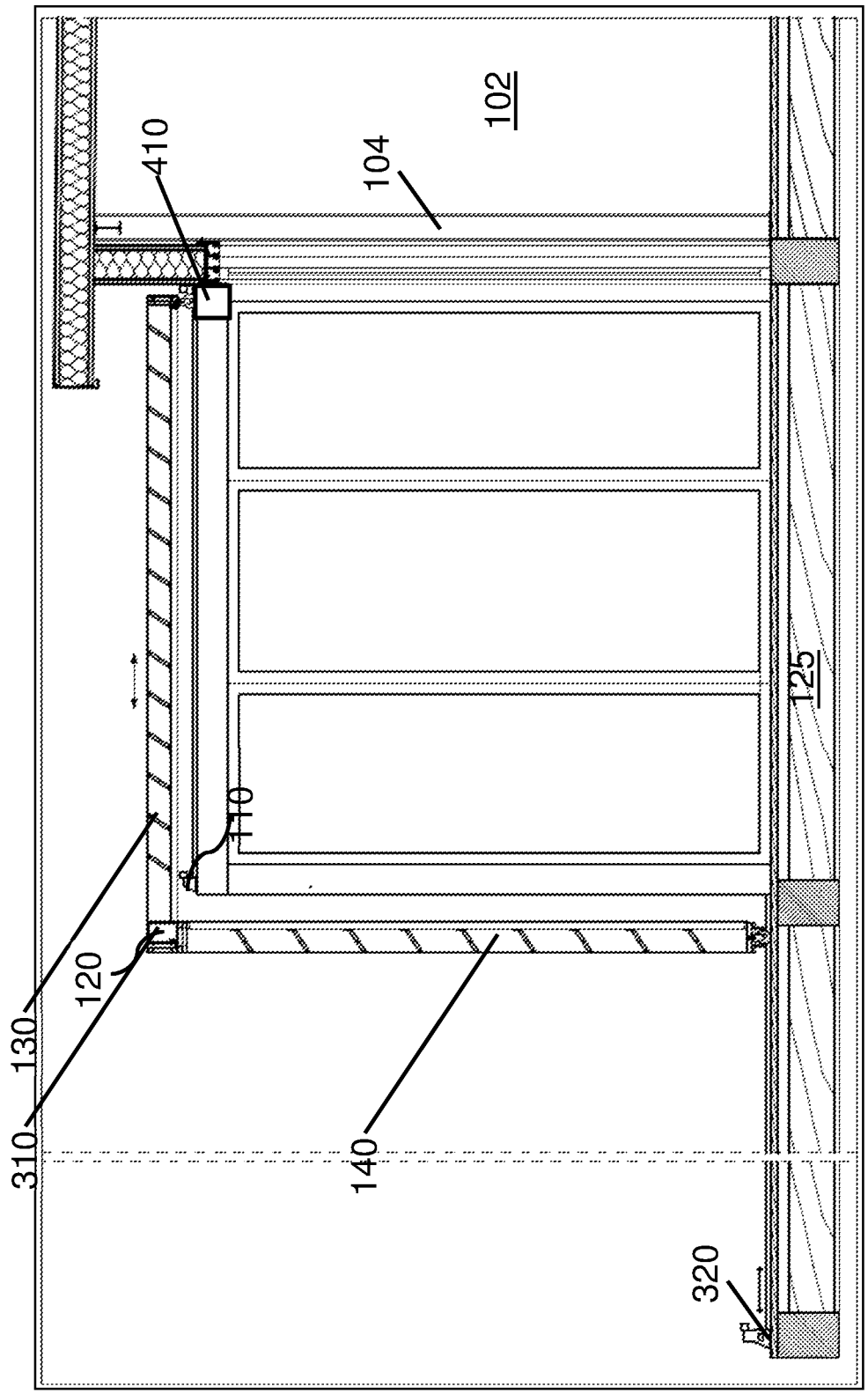

FIG. 4 shows a regulating system 400 ("system 400") according to another example embodiment. The displacement means 110 in this example comprises a plurality of L-shaped sets, forming a displacement grid. In its initial closed state, where the mobile pergola 120 is closest to the building 102, it can be laterally displaced along the distal beams 310 of the displacement means 110. Only a first grid line is shown, however a second, or more, grid lines can be added, enlarging the coverage area. Therefore, the pergola 120 may be displaced laterally 185 and perpendicularly 180 in order to provide shade in different zones. For the multiple pergola configuration, each pergola 120 can be independently displaced to provide the required coverage. Optionally, for additional stability and safety, a proximal crossing beam 410 fixes the displacement means 110 to the side of the structure providing a stronger and more rigid support for the pergola. FIG. 10 depicts a lateral section of system 400, wherein it can be seen how the different horizontal and vertical sections 130, 140 of pergola 120 may be laterally moved independent from one another over distal beam 310 and proximal beam 410 of the displacement means 110.

Figure 5:
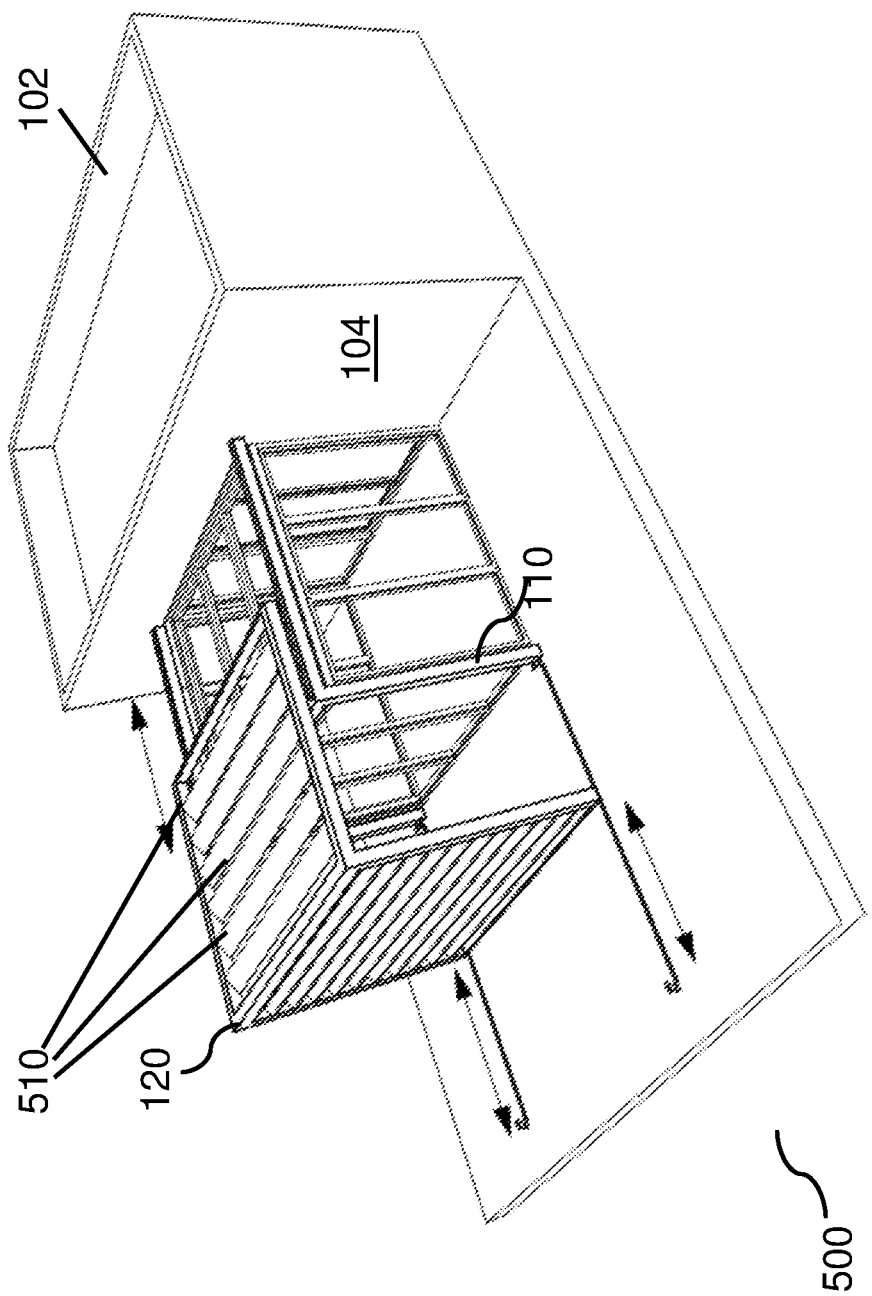
FIG. 5 depicts a regulating system according to another example embodiment of the present invention.
Figure 6:
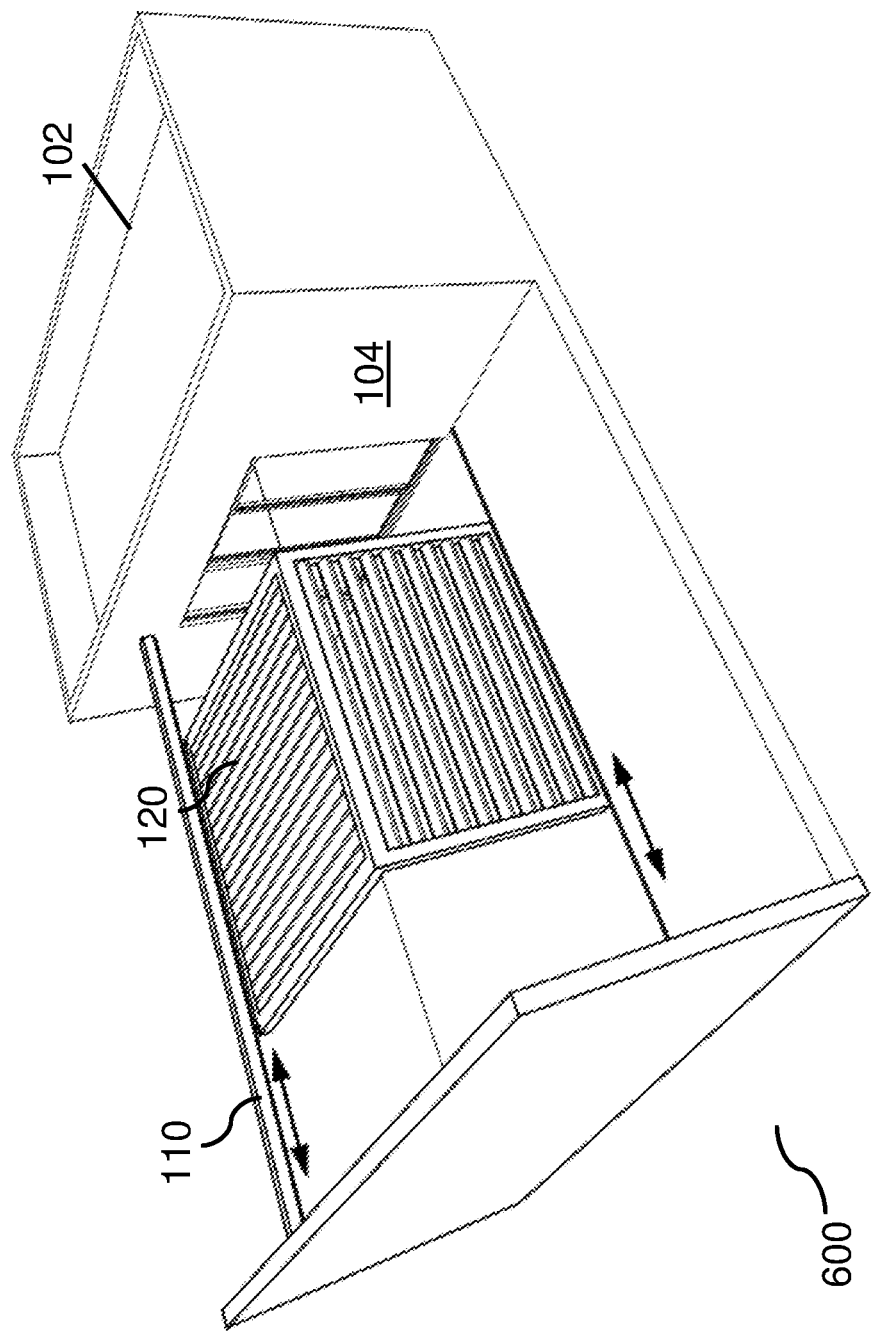
FIG. 6 depicts a regulating system according to another example embodiment of the present invention.

FIG. 5 shows a regulating system 500 ("system 500") according to another example embodiment. Herr system 500 includes, as the heat regulating means of the horizontal regulating section, a plurality of solar panels 510. FIG. 6 shows another example system 600, wherein the displacement means 110 is represented as only a single beam, and the mobile pergola 120 is configured to be displaced along the single beam by means of a first travel means for moving along the single beam and a second travel means for moving along the ground.

In another example, the displacement means 110 is configured over the structure 102, and the mobile pergola 120 is configured to be displaced on top of the displacement means 110, partially over the roof of the structure 102. The displacement means 110 may also extend out of the structure.

Figure 11:
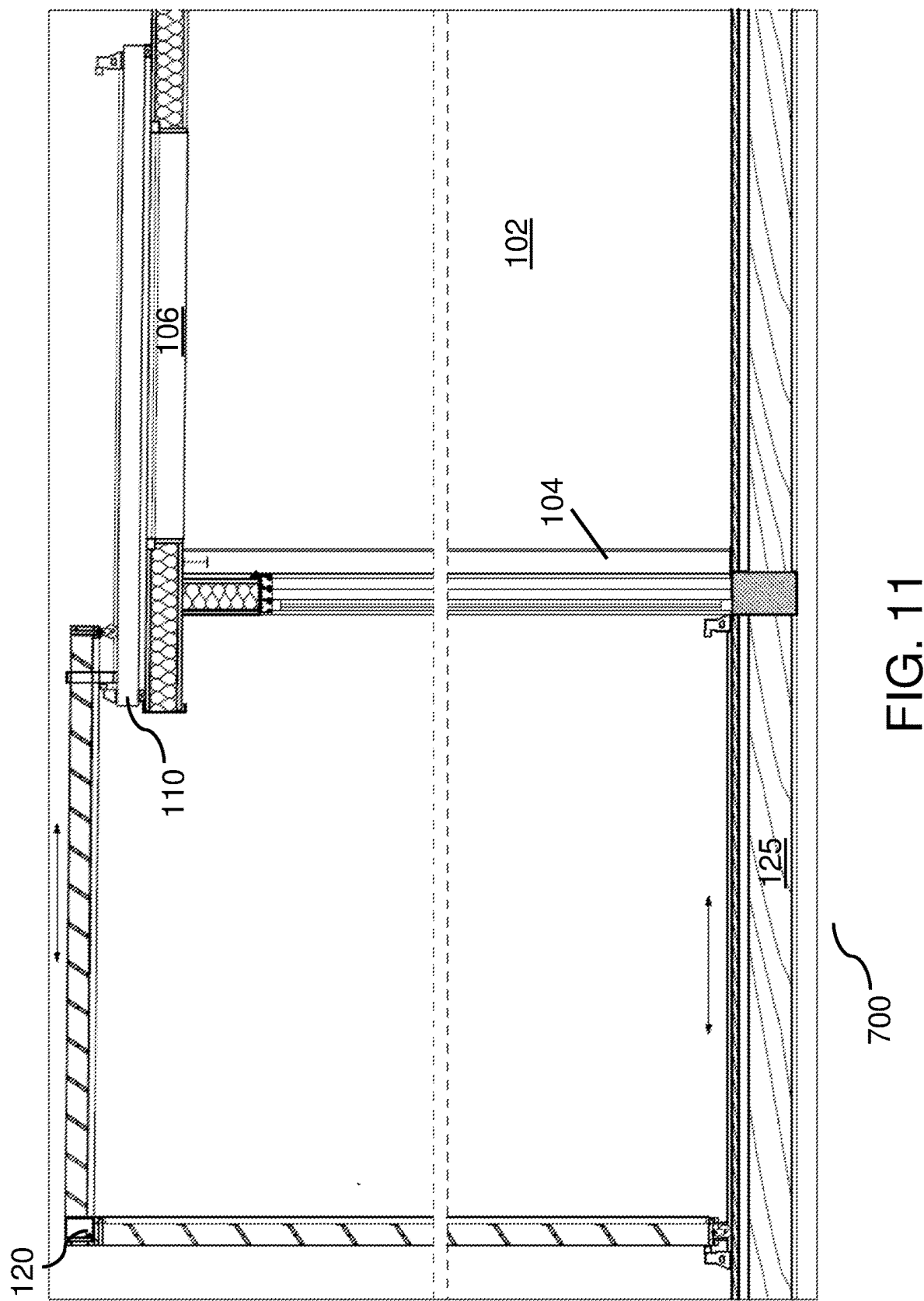
FIG. 11 depicts a regulating system according to another example embodiment of the present invention.

FIG. 11 shows a regulating system 700 ("system 700") according to another example embodiment. Here, the structure 102 includes a luminaire 106, or opening, in its roof, allowing light into the interior of the structure 102. The displacement means 110 is configured over the structure 102, and the mobile pergola 120 is configured to be displaced on top of the displacement means 110, partially over the roof of the structure 102, in order to provide heat and/or light regulation for the luminaire 106 opening. In both of these examples, the displacement means 110 may also extend out of the structure 102, as in the previous examples.

In a further embodiment, any of the aforementioned systems may include multiple stackable pergolas. In this case, each system has displacement means 110 configured for supporting more than one mobile pergola 120. The second pergola is larger than the first in order to be able to place the second pergola over the first pergola. It is thus possible to protect an entire surface, such as for example a terrace, from the sun, or to protect only part of it in a flexible manner, depending on the path of the sun. For larger spaces, it is possible to configure even more than two moveable pergolas, for example, three, four or five moveable pergolas.

Figure 12:
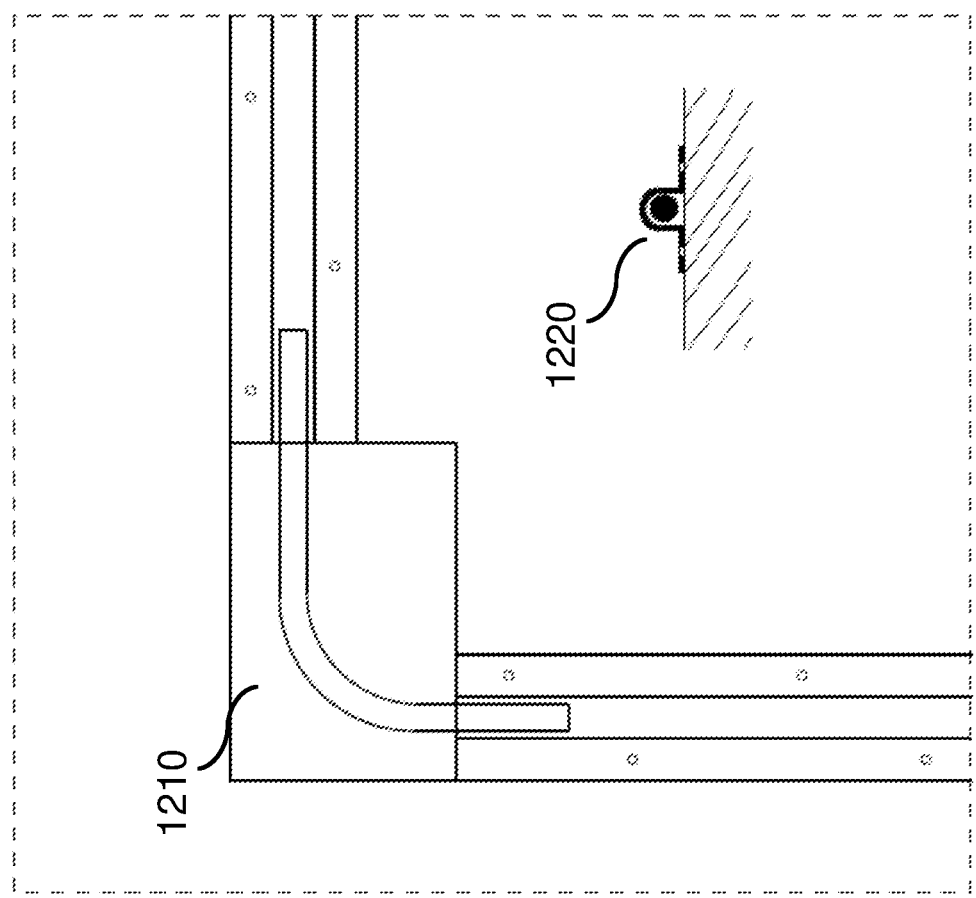
FIG. 12 depicts another example travel means of the regulating system.

FIG. 12 depicts guide means 1210 configured on the displacement means to aid the change of direction of the mobile pergola 120 as it is moved laterally and perpendicularly. The guide means 1210 comprises a guide 1220 which allows the complementary wheels on the mobile pergola to roll easily and be manipulated in a user-friendly manner.

Figure 13:
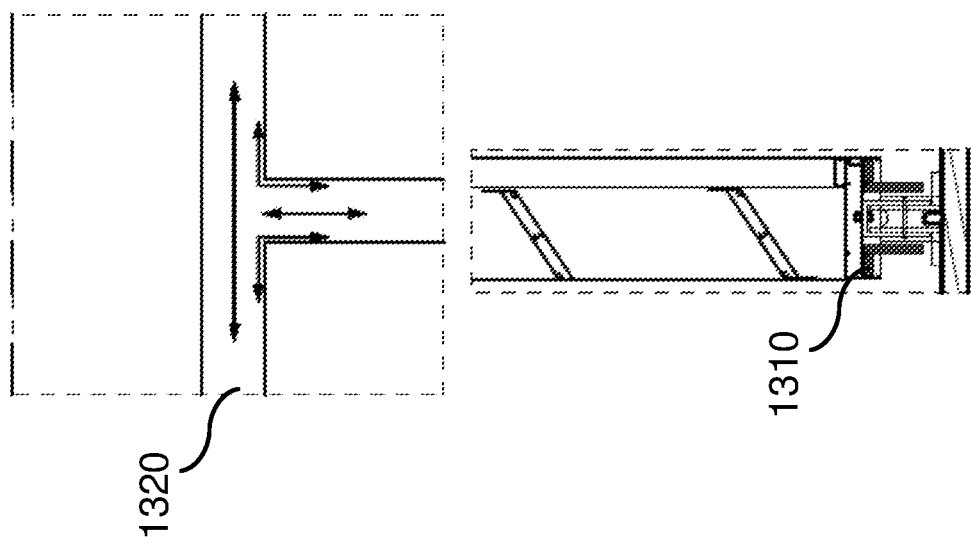
FIG. 13 depicts another example travel means of the regulating system.
Figure 14:
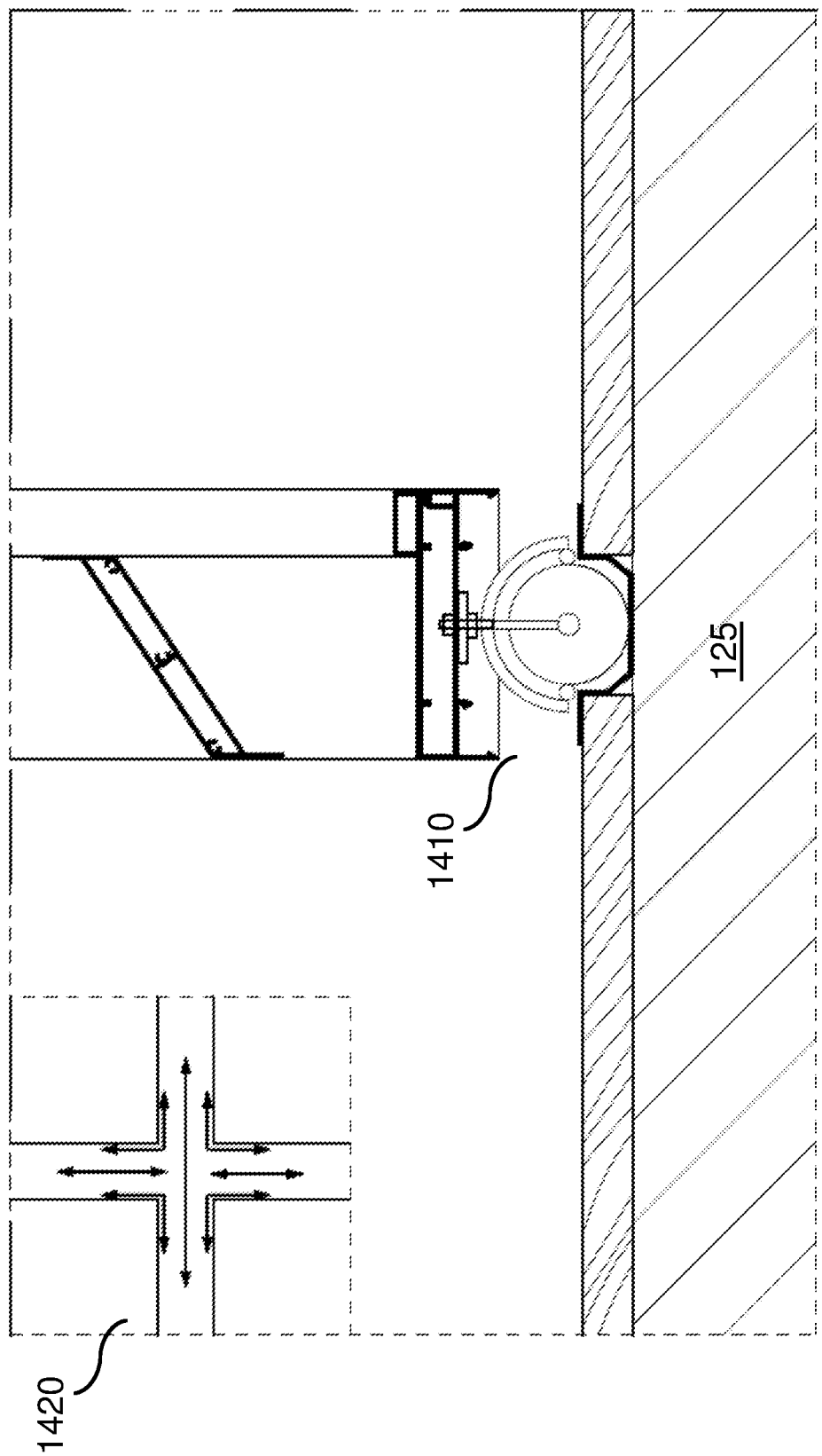
FIG. 14 depicts another example travel means of the regulating system.

FIG. 13 depicts an example wheel mechanism 1310 configured to be manually set to rotate (shown by element 1320) either in a lateral manner or longitudinal manner. In this configuration, the vertical section of this wheel mechanism can roll directly over the ground on which it is supported. FIG. 14 depicts another example wheel mechanism 1410 which is configured to freely rotate (shown by element 1420) in any direction, thereby facilitating the maneuverability for the user. In this configuration, the free moving wheel mechanism is aided by guide means in the floor in order to stay on its lateral or longitudinal course.

Therefore, the regulating system according to the above example embodiments is configured for providing a user-friendly and flexible heat and/or light regulation, a system which can be adapted to different sun light strengths and impinging angles as the weather changes, along the time of the day, or in changing seasons. The example heat and/or light regulating system for buildings described herein permits a user to globally regulate the amount of heat and/or light being blocked, or conversely being allowed through, in a variable and flexible manner.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A system configured for heat and/or light regulation, the system couplable to a side of a structure, comprising:
   at least one displacement means fixable to the side of the structure, and
   at least one moveable pergola detachably coupled to the at least one displacement means, wherein
   the at least one displacement means is configured for enabling displacement of the at least one moveable pergola in both a lateral direction and a perpendicular direction to the side of the structure along the ground,
   wherein the at least one moveable pergola comprises:
   at least one section comprising heat regulating means for regulating impinging sun and/or wind, each section is formed by a frame of four beams supporting the heat regulating means, and
   at least one travel means configured for allowing movement of the at least one section, the travel means arranged in at least one of the four beams, and wherein
   the at least one section is a horizontal section, with the heat regulating means configured for regulating sun and/or wind impinging from a substantially vertical direction, and the travel means being arranged on one, two, three or all four beams, or
   the at least one section is a vertical section, with the heat regulating means configured for regulating sun and/or wind impinging from a substantially lateral direction, and the travel means configured in at least a beam of the frame in contact with the ground.

2. The system of claim 1, wherein the at least one displacement means extends into or on top of the structure instead of being fixed to the side.

3. The system of claim 1, wherein the at least one moveable pergola is detachably above or below the at least one displacement means.

4. The system of claim 1, wherein the at least one displacement means includes at least two L-shaped sets of beams connected to each other via a crossing beam at a distal end of the structure, each set comprising one vertical beam connected to one perpendicular beam at a connecting end, each vertical beam fixed to the ground at its non-connecting end, each perpendicular beam coupled to the structure at its non-connecting end.

5. The system of claim 4, wherein the perpendicular beams of the at least two sets are connected to each other via a crossing beam at a proximal end of the structure, and the crossing beam is coupled to the structure.

6. The system of claim 1, further comprising at least one ground rail for facilitating movement of the travel means of the vertical section on the ground.

7. The system of claim 1, wherein the plane in which the vertical section is arranged is parallel to the plane of the side of the structure, or perpendicular to the plane of the side.

8. The system of claim 1, wherein
   the at least one moveable pergola includes at least one horizontal section and at least one vertical section,
   the at least one vertical section being coupled to the horizontal section at an angle, and
   the travel means being configured to allow for combined movement of the sections together in the same direction, or relative movement of the sections with respect to each other in different directions.

9. The system of claim 8, wherein the angle ranges from 45° to 135°.

10. The system of claim 1, wherein the at least one moveable pergola includes a single rectangular-shaped or L-shaped shared beam for coupling the horizontal section to the vertical section.

11. The system of claim 1, wherein
   the heat regulating means is selected from a group comprising a plurality of slats arranged in spaced relation to one other, a sheet of material with a plurality of openings, a sheet of material without openings,
   each slat has wings on each end and forms an ellipsoidal shape or a trapezoidal shape, and
   each slat is fixed or moveable.

12. The system of claim 1, wherein the heat regulating means includes at least one solar panel for collecting impinging solar energy.

13. The system of claim 1, wherein the travel means further includes wheels and rails with complementary profiles.

14. The system of claim 13, wherein
   a rail of the travel means of the vertical section has a convex profile, whereas a rail of the travel means of the horizontal section is a hollow rail permitting insertion of the wheels and a hanging fastening of the horizontal section.

15. The system of claim 13, wherein a moving end of the horizontal section includes first and second travel means that engage with complementary support elements of the displacement means.

16. The system of claim 1, wherein the system further includes a plurality of moveable pergolas of step-wise differing dimensions configured to be stored under or partially overlapping each other.

* * * * *